United States Patent
Sherman et al.

(10) Patent No.: US 12,320,825 B2
(45) Date of Patent: Jun. 3, 2025

(54) PROBE BLOCKAGE DETECTION AND REMOVAL

(71) Applicant: Rosemount Aerospace Inc., Burnsville, MN (US)

(72) Inventors: Andrew E. Sherman, Bradenton, FL (US); Brian B. Naslund, Chanhassen, MN (US); William G. Kunik, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 428 days.

(21) Appl. No.: 17/819,107

(22) Filed: Aug. 11, 2022

(65) Prior Publication Data

US 2024/0053379 A1 Feb. 15, 2024

(51) Int. Cl.
*G01P 21/00* (2006.01)
*B64D 47/00* (2006.01)
*G01P 5/16* (2006.01)

(52) U.S. Cl.
CPC .............. *G01P 21/00* (2013.01); *B64D 47/00* (2013.01); *G01P 5/16* (2013.01)

(58) Field of Classification Search
None
See application file for complete search history.

(56) References Cited

U.S. PATENT DOCUMENTS

| | | | |
|---|---|---|---|
| 3,089,331 A * | 5/1963 | Sharko | G01L 27/005 137/98 |
| 3,365,928 A * | 1/1968 | Andresen, Jr. | G01P 21/025 73/1.29 |
| 3,380,298 A * | 4/1968 | Hanson | G01P 21/025 73/182 |
| 4,174,049 A | 11/1979 | Bolen | |
| 4,498,347 A | 2/1985 | Grantham et al. | |
| 4,617,826 A | 10/1986 | Hagen | |
| 10,502,760 B2 | 12/2019 | Cahill et al. | |
| 11,441,963 B1 * | 9/2022 | Daup | G01L 27/007 |
| 2012/0118076 A1 | 5/2012 | Foster | |
| 2012/0180581 A1 | 7/2012 | Foster | |
| 2013/0145862 A1 | 6/2013 | Leblond et al. | |
| 2017/0233081 A1 | 8/2017 | Sautron et al. | |
| 2019/0178906 A1 | 6/2019 | Vadada et al. | |
| 2019/0383849 A1 | 12/2019 | Naslund et al. | |

FOREIGN PATENT DOCUMENTS

GB 2418739 A 4/2006

OTHER PUBLICATIONS

Extended European Search Report for EP Application No. 23190336.0, Dated Dec. 20, 2023, pp. 8.

* cited by examiner

*Primary Examiner* — Daniel S Larkin
(74) *Attorney, Agent, or Firm* — Kinney & Lange, P.A.

(57) ABSTRACT

A system includes a body, a sensor, a pressurized fluid source, and a blockage detection module. The body defines a cavity open to an ambient environment at a port. The sensor communicates with the cavity to produce a signal representative of a fluid pressure within the cavity. The blockage detection module includes a pressure regulator and a valve disposed along a conduit fluidly connecting the pressurized fluid source to the cavity. The blockage detection module includes a processor and memory encoded with instructions of a blockage detection method.

20 Claims, 8 Drawing Sheets

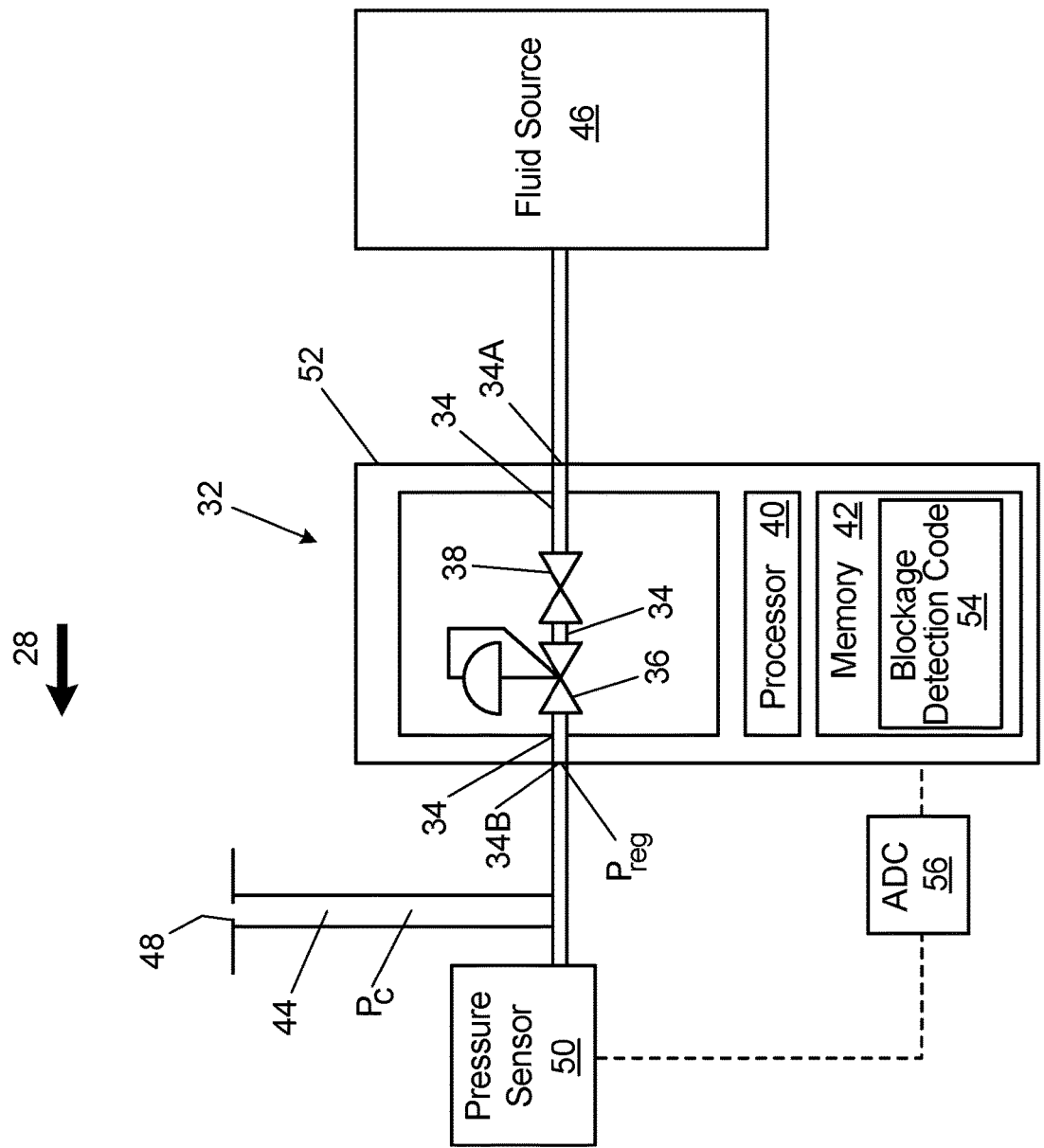

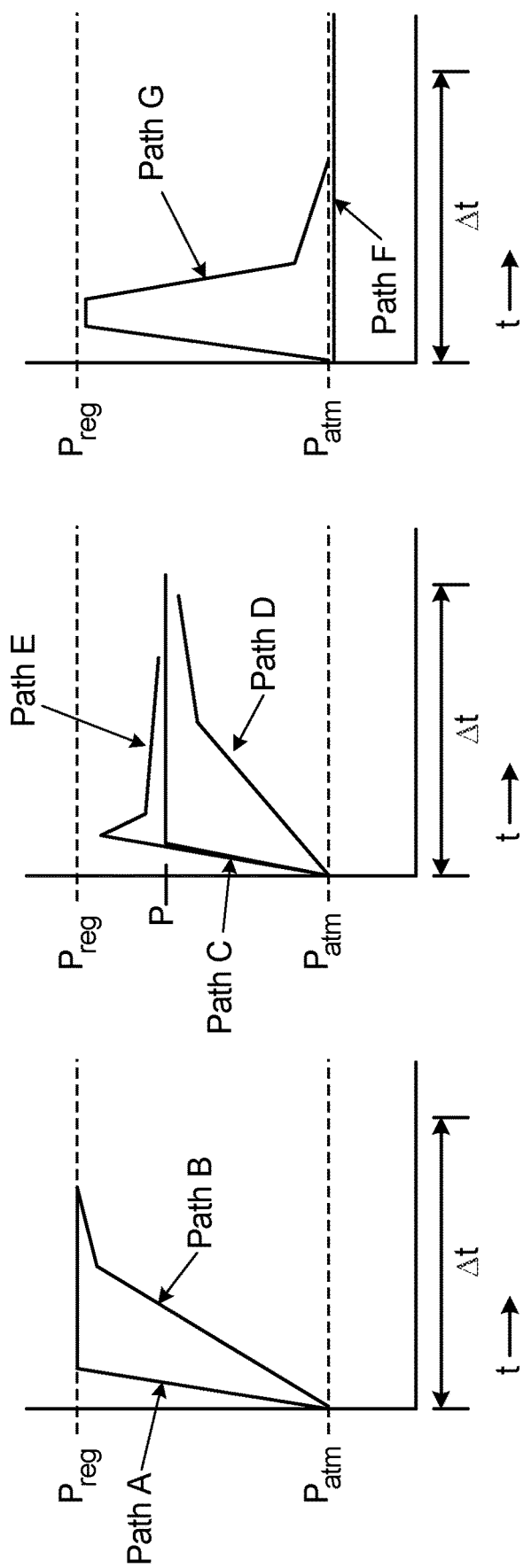

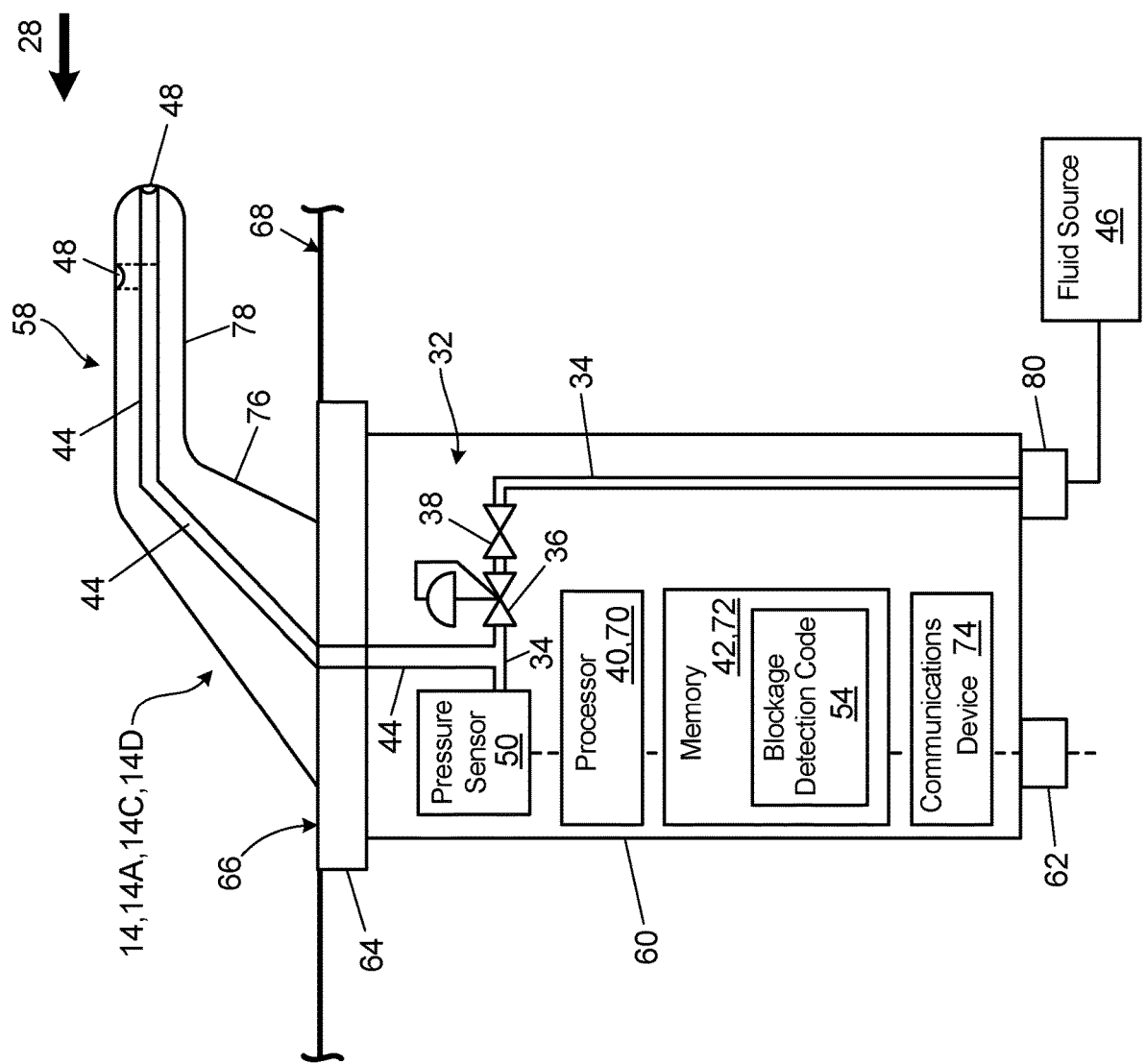

PROBE BLOCKAGE DETECTION AND REMOVAL

BACKGROUND

The present disclosure relates generally to air data systems and, more particularly, to detecting blockage within air data probe cavities.

Modern aircraft often incorporate air data systems that calculate air data outputs based on measured parameters collected from various sensors positioned about the aircraft. For instance, many air data systems utilize air data probes that measure pneumatic pressure of airflow about the aircraft exterior to generate aircraft air data outputs, such as calibrated airspeed, angle of attack (i.e., an angle between the oncoming airflow or relative wind and a reference line of the aircraft, such as a chord of a wing of the aircraft), Mach number, altitude, or other air data parameters. When pneumatic cavities within the air data probes become partially or fully blocked, the air data probe may produce erroneous air data outputs and/or cease to function.

SUMMARY

A system in accordance with an exemplary embodiment of this disclosure includes a body, a sensor, a pressurized fluid source, and a blockage detection module. The body defines a cavity open to an ambient environment at a port. The sensor communicates with the cavity and produces a signal indicative of a fluid pressure within the cavity. The blockage detection module includes a conduit, a pressure regulator, a valve, a processor, and a memory. The pressure regulator and valve are disposed along the conduit, which connects the pressurized fluid source to the cavity with the valve in an open position. The memory is encoded with instructions that, when executed by the processor, cause the blockage detection module to execute steps of a blockage detection test.

BRIEF DESCRIPTION OF THE DRAWINGS

FIG. 2 is a schematic diagram of a blockage detection module for use with air data probes of the aircraft.

FIG. 3A, FIG. 3B, and FIG. 3C are exemplary pressure profiles produced by blockage detection module that are indicative of a blocked, a partially blocked, and unblocked air data probe cavity, respectively.

FIG. 4A is an exemplary air data probe that includes an integrated blockage detection module.

DETAILED DESCRIPTION

Figure 1:
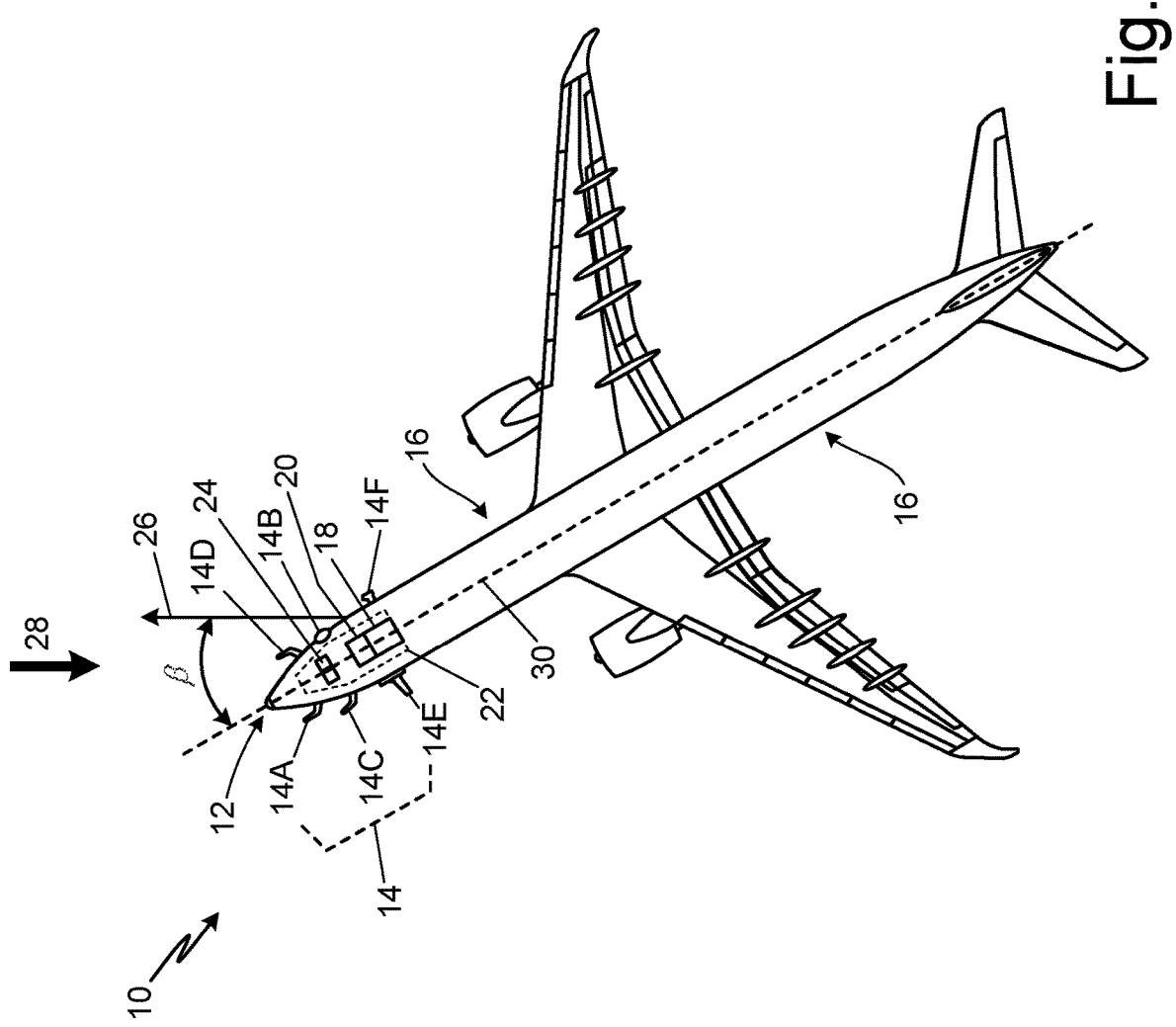
FIG. 1 is a top plan view and schematic representation of an aircraft that includes air data probes for producing air data outputs.

FIG. 1 is a schematic diagram that illustrates aircraft 10 equipped with air data system 12. Air data system 12 includes at least one air data probe 14 and may include multiple air data probes 14. Air data probes 14 can include one or more of pitot pressure probe 14A, static pressure probe 14B, pitot-static pressure probe 14C, multifunction probe 14D, wing-mounted angle of attack probe 14E, and/or total temperature probe 14F among other possible air data probes 14. Air data probes 14 may be positioned on exterior 16 of aircraft 10 and configured to sense one or more air data parameters of aircraft 10. Some air data probes 14 may be configured to sense one or more pressures external to aircraft 10, for example, pitot pressure probe 14A, static pressure probe 14B, pitot-static pressure probe 14C, and/or multifunction probe 14D. The sensed pressure (or pressures) may be used to calculate various air data parameters. These air data parameters include, but are not limited to, airspeed, altitude, angle of attack, and angle of side slip. One or more other air data equipment, such as inertial reference unit 18 and/or air data computer 20, can be connected to air data probes 14 via aircraft data bus 22 and/or connected to air data probes 14 pneumatically to form one or more air data systems 12. Aircraft data bus 22 can take the form of direct electrical couplings and/or data bus couplings configured to communicate according to one or more communication protocols, such as the Aeronautical Radio, Incorporated (ARINC) 429 communication protocol, controller area network (CAN) bus communication protocol, military standard 1553 (MIL-STD-1553) communication protocol, Ethernet, or other analog or digital communication protocols. Each air data system 12 provides air data parameters to consuming systems 24 of aircraft 10, which may be one or more computing systems located in aircraft 10 (e.g., an avionics bay or other electronics bay).

Some air data probes 14 include one or more cavities that communicate with the ambient environment about aircraft 10 via one or more ports. As aircraft 10 travels along flight vector 26, on-coming air 28 represents the vector of air relative to aircraft 10. While aircraft 10 is depicted in a side slip condition represented by angle β relative to aircraft centerline 30, aircraft 10 may assume other orientations relative to flight vector 26 and/or on-coming air 28. Pitot pressure probe 14A includes a port at a distal tip of a cylindrical or barrel portion of the probe that intercepts oncoming air 28 external to aircraft 10. Static pressure probes have ports orientated perpendicularly to the exterior of aircraft 10, or perpendicular to a cylindrical or barrel portion of the probe. Pitot-static pressure probe 14C and multifunction probes 14D may include ports at a distal tip to intercept oncoming air 28 about aircraft 10 as well as ports oriented perpendicularly to its cylindrical or barrel portion. Each port of a multiport air data probe communicates with a discrete cavity within the probe body from which respective sensors (e.g., a pressure transducer) measures the air pressure within respective cavities.

Ice, water, debris, and/or insects can form or collect within the cavities rendering the cavities partially obstructed (i.e., partially blocked) or fully obstructed (i.e., blocked). Partially blocked cavities may experience reduced response times and/or biased pressure readings caused by restricted flow through the partial blockage. Blocked cavities are effectively isolated from respective ports, which causes the pressure sensors to provide erroneous readings. Air data parameters determined from one or more erroneous pressure readings are also erroneous.

FIG. 2 is a schematic of blockage detection module 32 which can be used in conjunction with some air data probes 14 as well as other devices in which pressure sensors communicate with a target fluid via a cavity and/or passage susceptible to blockage. Blockage detection module 32 includes conduit 34, pressure regulator 36, valve 38, processor 40, and memory 42. As shown in FIG. 2, blockage detection module 32 fluidly communicates with cavity 44 of air data probe 14 and fluid source 46. Cavity 44 communicates with an ambient environment surrounding aircraft 10 and air data probe 14 at port 48. Complete or partial blockage of cavity 44 between port 48 and pressure sensor 50 affect or prevent air data measurements.

In some examples, blockage detection module 32 is contained within housing 52, which is discrete from a housing of air data probe 14. In such examples, blockage detection module 32 may be implemented as a line-replaceable unit (i.e., LRU) installed on aircraft 10. In other such examples, blockage detection module 32 is not installed on aircraft 10 and is utilized during maintenance operations of aircraft 10. In other examples, blockage detection module 32 is incorporated within a housing of air data probe 14 or attached to an exterior of air data probe 14, to perform in-situ blockage detection tests.

Blockage detection module 32 communicates with fluid source 46 to provide pressurized fluid into cavity 44 of air data probe 14. Fluid source 46 can be any pressurized fluid source capable of supplying fluid at a pressure exceeding a target pressure (e.g., a regulated pressure output by pressure regulator 36) for the duration of the blockage test. The supply pressure of fluid source 46 accounts for pressure losses associated with any fluid path connecting fluid source 46 to blockage detection module 32 as well as any intermediate components facilitating the connection to blockage detection module 32. In one example, fluid source 46 can be a pressurized bottle or storage vessel mounted to aircraft 10. Such pressurized bottle storage provides a supply of fluid independent of engine and auxiliary power unit operation of aircraft 10. It allows air data probes 14 to be tested for blockage and/or clearing of blockages without engine and APU operation. In a similar example, fluid source 46 can be a mobile pressurized bottle or container that is not mounted to aircraft 10. Mobile pressurized bottles can be used on multiple aircraft at a given location during maintenance of air data probes 14. In another on-aircraft example, fluid source 46 can be bleed air produced by a gas turbine engine or auxiliary power unit of aircraft 10. Since bleed air is a pressurized and heated source of air, bleed air also enables blockage detection module 32 to melt and/or evaporate ice formed within air data probe cavities.

Conduit 34 defines a path through blockage detection module 32 from inlet 34A to outlet 34B. Conduit 34 can be a tube, pipe, conduit, machined passages, internal passages of pressure regulator 36 and/or valve 38, or a combination of some or all of these elements that define a continuous flow path through blockage detection module 32. Fluid source 46 can be connected directly to blockage detection module 32 at inlet 34A or indirectly via additional tube, pipe, conduit, machined passages, fittings, adapters, and/or hose, among other possible fluid connections. Likewise, cavity 44 may be placed in direct fluid communication with outlet 34B, such as when blockage detection module 32 is integrated with air data probe 14. In other examples, intervening components indirectly place cavity 44 in fluid communication with outlet 34B, such as when blockage detection module 32 is a discrete line replacement unit or assembly used during maintenance operations.

Pressure regulator 36 is disposed along conduit 34 between valve 38 and outlet 34B and reduces the supply pressure delivered to blockage detection module 34 by fluid source 46 while maintaining the target pressure (i.e., regulated pressure) within cavity 44 of air data probe 14 despite a variation of supply pressure during the blockage detection test. The target pressure (i.e., regulated pressure) is greater than atmospheric pressure (i.e., ambient pressure) by a margin that exceeds the error band of pressure sensor 50. The operational limit of pressure sensor 50 bounds the upper limit of the target pressure. Typically, the target pressure does not exceed one and a half times the upper rated pressure of pressure sensor 50 to prevent damage to pressure sensor 50.

Valve 38 is disposed along conduit 34 between pressure regulator 36 and inlet 34A. Valve 38 includes at least two positions, an open state and a closed state. In the closed state, valve 38 inhibits flow through blockage detection module 32 such that fluid source 46 is isolated from cavity 44 (i.e., not in fluid communication with cavity 44). In the open state, fluid may flow through blockage detection module 32 and thereby places fluid source 46 in fluid communication with cavity 44. Examples of valve 38 include a needle valve, a gate valve, and a solenoid valve, among other possible valve examples.

Processor 40 executes blockage detection code 54, which evaluates a signal from pressure sensor 50 during a time interval to determine if cavity 44 is unblocked, partially blocked, or completely blocked. In some examples, blockage detection code 54 also evaluates the signal from pressure sensor 50 to determine if a blockage is forming or clearing. Examples of processor 40 can include any one or more of a microprocessor, a controller, a digital signal processor (DSP), an application specific integrated circuit (ASIC), a field-programmable gate array (FPGA), or other equivalent discrete or integrated logic circuitry.

Memory 42 can be configured to store information within blockage detection module 32 and/or air data probe 14 during operation. As illustrated in FIG. 2, memory 42 stores blockage detection code 54. Memory 42, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Memory 42 can include volatile and non-volatile computer-readable memories. Examples of volatile memories can include random access memories (RAM), dynamic random-access memories (DRAM), static random-access memories (SRAM), and other forms of volatile memories. Examples of non-volatile memories can include, e.g., magnetic hard discs, optical discs, flash memories, or forms of electrically programmable memories (EPROM) or electrically erasable and programmable (EEPROM) memories.

Cavity 44 is any void formed by a machined passage, conduit, pipe, and/or tube within air data probe 14 (or other device) that is open to and fluidly communicates with the ambient environment at port 48 (or ports 48). Opposite port 48, cavity 44 is closed-ended such that cavity 44 does not form a passage through air data probe 14 (or other device) when valve 38 of blockage detection module 34 is in the closed position.

Pressure sensor 50 is fluidly connected to cavity 44 and produces a signal indicative of a pressure within cavity 44 as a function of time. For example, pressure sensor 50 can be a pressure transducer capable of producing a signal proportional to cavity pressure, $P_c$, at a given sample rate. Examples of pressure sensor 50 producing an analog signal are paired with digital-to-analog converter (ADC) 56 to deliver a digital signal to blockage detection module 32. In such examples, analog-to-digital converter (ADC) 56 can be housed within discrete housing 52 of blockage detection module 32 or a housing of air data probe 14.

FIG. 3A, FIG. 3B, FIG. 3C are exemplary pressure measurements produced by pressure sensor 50 during operation of blockage detection module 32. FIG. 3A depicts exemplary pressure measurements indicative of a completely blocked cavity 44 at the conclusion of the blockage detection test. FIG. 3B depicts exemplary pressure measurements indicative of a partially blocked cavity 44 while FIG. 3C depicts exemplary pressure measurements indicative of an unblocked blocked cavity 44, each by the conclusion of the blockage detection test. While the depicted pressure measurement profiles have been simplified to illustrate various outcomes of the blockage detection test, it should be understood that pressure measurements may contain fluctuations, local minimums, and/or local maximums associated with real-time measurement of cavity pressure, $P_c$.

Referring to FIG. 3A, the pressure of path A equals, or is approximately equal to regulated pressure Preg for the entire blockage detection test and represents cavity 44 in a blocked condition. Since a complete blockage of cavity 44 prevents fluid from escaping through port 48, the pressure within cavity 44 quickly rises until it equalizes with the regulated pressure Preg output by pressure regulator 36. Pressure path B illustrates a pressure measurement profile that approaches regulated pressure Preg at a slower rate than path A and may be indicative of cavity 44 that, initially, is not completely blocked but becomes completely blocked by the conclusion of the blockage test. Criteria for detecting cavity 44 in a blocked state include evaluating average pressure of the pressure profile during time interval Δt relative to regulated pressure Preg. If the average pressure is equal to the regulated pressure or within a tolerance range of the regulated pressure, the pressure profile indicates a blockage within cavity 44. The extent of the tolerance range depends on the design characteristics of cavity 44, such as a diameter of port 48, the volume of cavity 44, and the geometry of cavity 44, among other possible design parameters.

Pressure path C shown in FIG. 3B illustrates an exemplary pressure measurement profile in which cavity pressure quickly approaches an intermediate pressure between the regulated pressure Preg and atmospheric pressure $P_{atm}$. Such profiles represent a partially blocked cavity 44. When pressure profile increases during the blockage test, such as pressure path D, the degree of partial blockage is increasing as the intermediate pressure approaches the regulated pressure. Contrastingly, the decreasing pressure profile shown by pressure path E indicates a blockage that is partially cleared. Criteria for detecting partial blockage within cavity 44 based on the pressure profile include evaluating average pressure of the profile during time interval Δt relative to regulated pressure Preg and atmospheric pressure $P_{atm}$. When cavity pressure is less than the regulated pressure Preg and greater than atmospheric pressure $P_{atm}$, a partial blockage of cavity 44 is indicated.

Referring to FIG. 3C, pressure path F depicts cavity pressure $P_c$ equal to or less than atmospheric pressure $P_{atm}$ and represents cavity 44 in an unblocked state for the entire duration of the blockage test. Pressure path G indicates cavity 44 in a blocked, or partial blocked state at the beginning of the blockage test. As shown, pressure path G decreases during the blockage test. Before the conclusion of the test, pressure path G equals or is less than atmospheric pressure for a minimum subinterval of the blockage test. Pressure path G represents cavity 44 having an initially blocked condition, or partially blocked condition, which is subsequently cleared (i.e., unblocked) by the conclusion of blockage detection test. Criteria for detecting an unblocked cavity include evaluating average cavity pressure during time interval Δt against atmospheric pressure $P_{atm}$. An average cavity pressure equal to or less than atmospheric pressure indicates an unblocked cavity 44.

FIG. 4A is a schematic of an exemplary air data probe 14. Air data probe 14 includes blockage detection module 32, cavity 44, one or more ports 48, pressure sensor 50, body 58, housing 60, and connector 62. Body 58 forms the exterior or exterior-facing portion of air data probe 14 that defines cavity 44 and one or more ports 48. Body 58 includes at least base 64 for mounting air data probe 14 to aircraft 10. Exterior surface 66 of base 64 conforms to a contour of exterior surface 68 of aircraft 10 to inhibit disruptions to oncoming airflow 28. Housing 60 joins to body 58, extending inward of exterior surface 68 to enclose pressure sensor 50. Pressure sensor 50 communicates with cavity 44 and may provide signal P indicative of a pressure within cavity 44 and, hence oncoming airflow 28, to consuming systems 24 via connector 62 in some examples. In other examples, air data probe 14 can include processor 70, memory 72, and communications device 74 for determining air data parameters internal to air data probe 14, which are communicated to consuming systems 24 via connector 62.

Processor 70 and memory 72 are analogous to processor 40 and memory 42 and can be any of the previously described examples. In some instances, the functions of processor 40 and processor 70 may be formed by the same processor or may be distributed among multiple processors contained within housing 60 of air data probe 14. Similarly, memory 42 and memory 72 can be combined, the functions of each performed by a combined memory unit within housing 60. Communication device 74 can be a network interface card (or other interface device) configured to send and receive data over a communications network and/or data bus according to one or more communications protocols, such as the ARINC 429 communication protocol, CAN bus communication protocol, MIL-STD-1553 communication protocol, or other communication protocol.

Figure 4B:
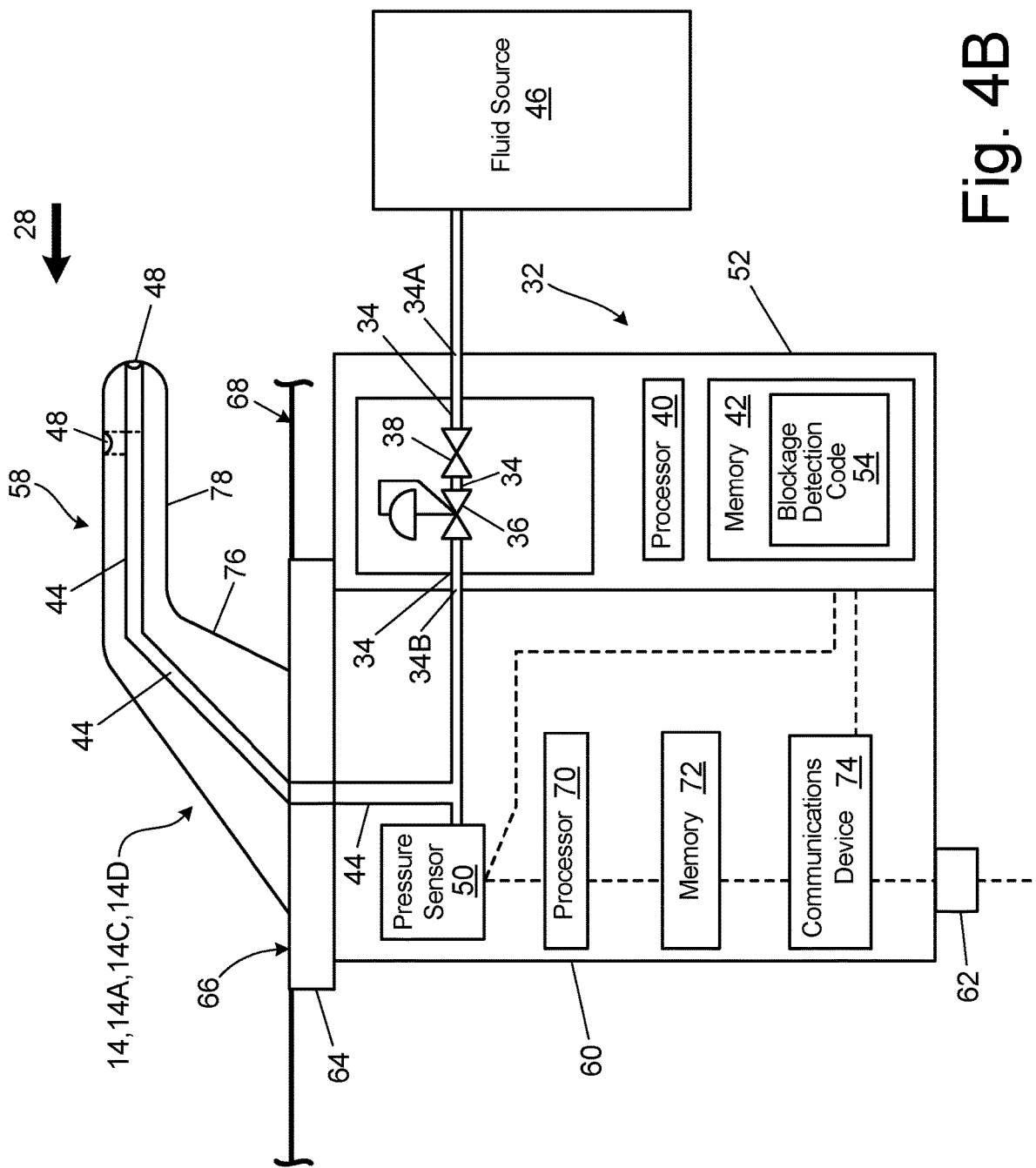
FIG. 4B is an exemplary air data probe in which the blockage detection module attaches to the exterior of the air data probe.

As depicted in FIG. 4A, air data probe 14 is one of pitot pressure probe 14A, pitot-static pressure probe 14C, or multifunction probe 14D. For each of these exemplary air data probes 14, body 58 also includes strut 76 protruding away from base 64 and barrel 78 protruding forward from strut 76 into oncoming airflow 28. In this instance, cavity 44 extends through base 64, strut 76, and barrel 78 to port 48. Port 48 may be located at a forward-most distal tip of barrel 78 (e.g., pitot pressure probe 14A). Multiple ports 48 can be located at each of the distal tip of barrel 78 and along a cylindrical wall of barrel 78 (e.g., pitot-static pressure probe 14C or multifunction probe 14D). Examples of air data probe 14 that include multiple ports 48 include multiple discrete cavities 44, each cavity 44 communicating with one of ports 48. For example, pitot-static pressure probe 14C may include ports 48 located at the distal tip of barrel 78 and one or more additional ports 48 spaced from the distal tip of barrel 78. Such additional ports 48 penetrate a cylindrical side wall of barrel 78 as represented by dashed lines in FIG. 4A, FIG. 4B, and FIG. 4C. Pairs of additional ports 48 can be combined in multifunction probe 14D to determine angle of attack and/or angle of side slip in addition to static and dynamic pressures captured by pitot-static pressure probe 14C.

Conduit 34, pressure regulator 36, valve 38, processor 40, and memory 42 of blockage detection module 32 are contained within housing 60 of air data probe 14. Conduit 34 extends from cavity 44 to fitting 80 attached to an exterior of housing 60 (e.g., an end wall or side wall of housing 60). Pressure regulator 36 and valve 38 are disposed along conduit 34 and operate as described above. Fluid source 46 connects to blockage detection module 32 through fitting 80.

Figure 4C:
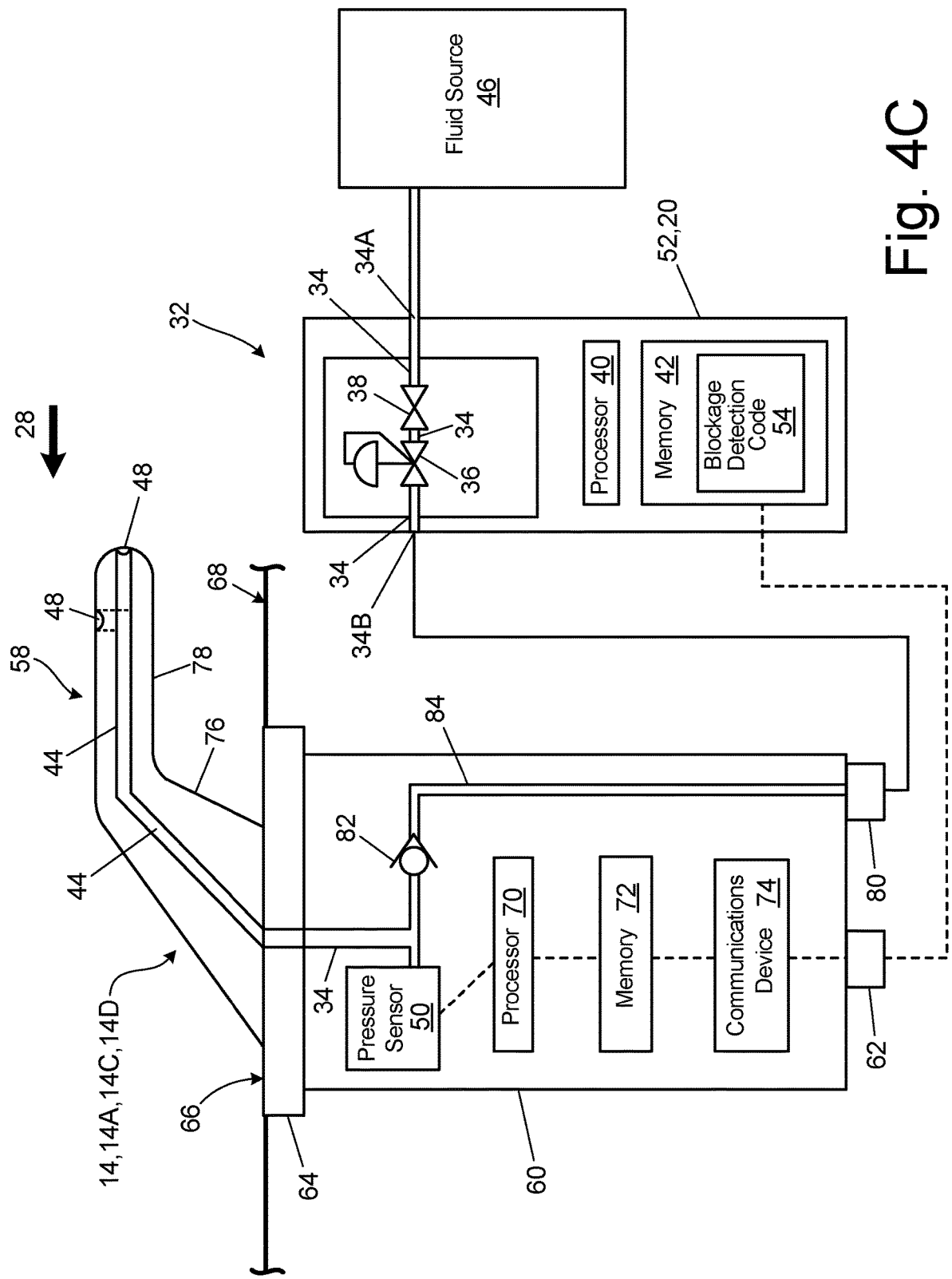
FIG. 4C is a schematic of an exemplary air data probe and remote blockage detection module.

FIG. 4B and FIG. 4C depict additional examples of air data probe 14 in which blockage detection module 32 is not enclosed by the probe housing. In each example, conduit 34, pressure regulator 36, valve 38, processor 40, and memory 42 of blockage detection module 32 are enclosed by module housing 52, or the housing of air data computer 20, discrete from housing 60 of air data probe 14. Air data probes 14 with externally mounted or remote blockage detection module 32 include one or more of fitting 80 and check valve 82.

FIG. 4B depicts housing 52 of blockage detection module 32 attached to an exterior of housing 60. Cavity 44 extends through base 64, strut 76, and barrel 78 to port 48. Pressure sensor 50 and conduit 34 fluidly communicate with cavity 44. Since blockage detection module 32 mounts to housing 60 of air data probe 14, conduit 34 communicates with cavity 44 via a penetration through housing 60 of air data probe 14. Processor 40 and memory 42 of blockage detection module 32 receive signal P from pressure sensor 50 through housing 60. After execution of blockage detection code 54, processor 40 may cause blockage detection module 32 to output status of cavity 44 via communications device 74 and connector 62 via a similar through housing penetration. Fluid source 46 fluidly connects to inlet 34A of conduit 34.

FIG. 4C depicts blockage detection module 32 remotely located from air data probe 14. As depicted, conduit 34, pressure regulator 36, valve 38, processor 40, and memory 42 of blockage detection module 32 are enclosed within module housing 52 or, alternatively, a housing of air data computer 20. Examples of blockage detection module 32 integrated into air data computer 20 may have components that are discrete from internal components of air data computer 20, or at least some components of blockage detection module 32 (e.g., processor 40 and memory 42) can be incorporated partially or wholly into components of air data computer 20. In each example, air data probe 14 includes internal path 84 fluidly connecting cavity 44 to fitting 80. Outlet 34B of conduit 34 connects to fitting 80 via a pipe, conduit, and/or hose or other fluidic connection placing blockage detection module 32 in communication with cavity 44 via fitting 80 and path 84. Fluid source 46 fluidly connects to inlet 34A of conduit 34. Air data probe 14 can include check valve 82 disposed along path 84 to enclose cavity 44 when blockage module 32 is not in use.

Figure 5:
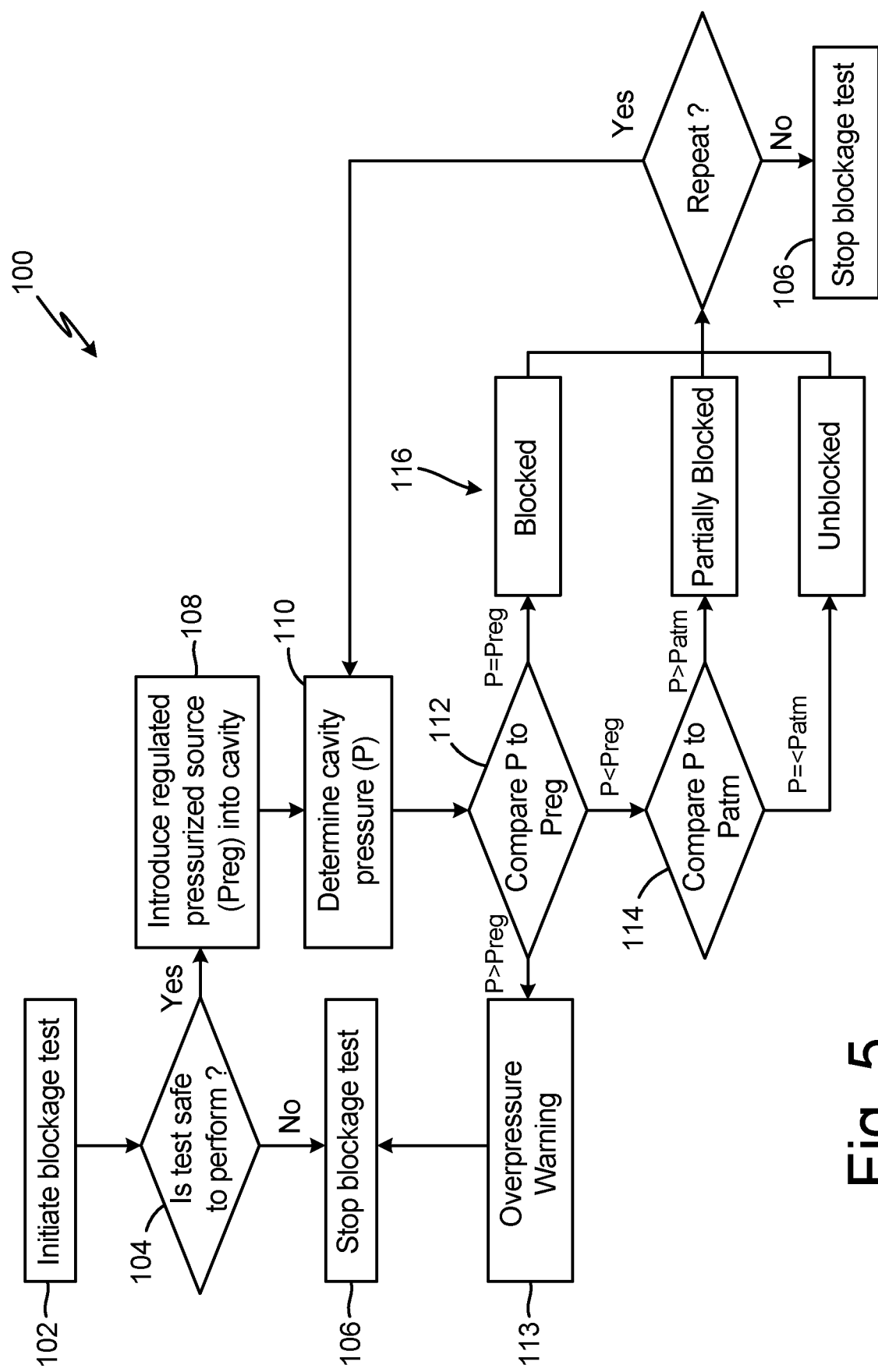
FIG. 5 and FIG. 6 are process diagrams depicting exemplary steps of performing a blockage detection test.
Figure 6:
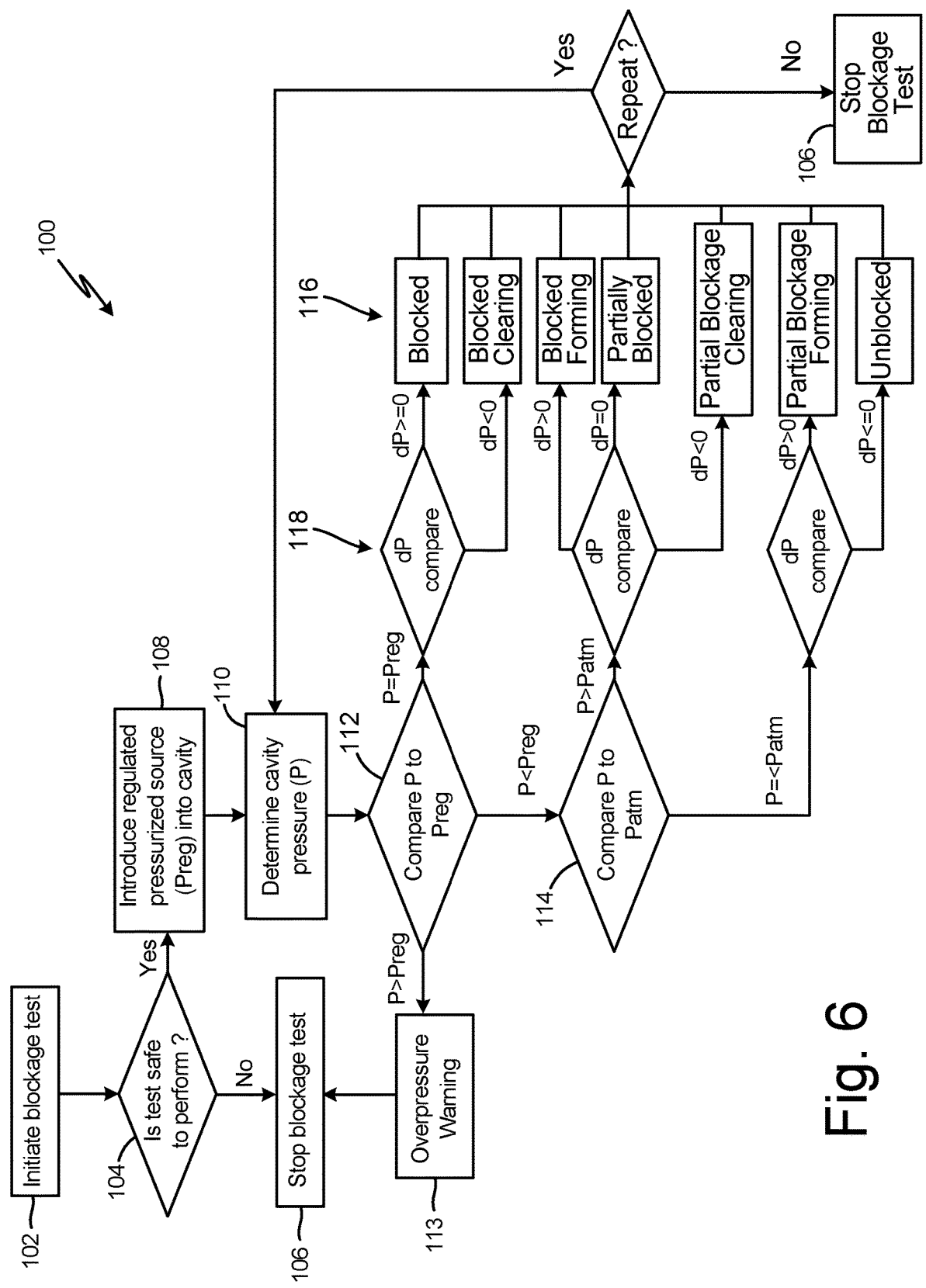

FIG. 5 is a schematic describing the operation of blockage detection module 32 using blockage detection code 54. Method 100 includes one or more of steps 102, 104, 106, 108, 110, 112, 114, and 116. As depicted in FIG. 6, method 100 can include additional step 118. Steps of method 100 are performed by blockage detection module 32 and is embodied as instructions stored within memory 42 and executed by processor 40 of blockage detection module 32. The sequence depicted is for illustrative purposes only and is not meant to limit method 100 in any way as it is understood that the portions of the method can proceed in a different logical order, additional or intervening portions can be included, or described portions of the method can be divided into multiple portions, or described portions of the method can be omitted without detracting from the described above.

Initiation of the blockage detection test occurs in step 102. For example, consuming systems 24 can initiate the blockage detection test automatically upon engine start or power-on of aircraft 10. Alternatively, operators or maintenance personnel can initiate the blockage detection test manually using consuming systems 24 of aircraft 10 (e.g., by entering a blockage detection mode or a maintenance mode of aircraft 10). In each case, blockage detection module 32 receives instructions to begin a blockage detection test from one of the consuming systems 24 of aircraft 10. Where blockage detection module 32 is not mounted on aircraft 10 (e.g., a blockage detection module incorporated into a maintenance tool), the blockage detection test can be initiated manually using a user interface incorporated into the maintenance device.

Either prior to step 102 or after step 102, blockage detection module 32 may determine if air data is required for safe operation of aircraft 10 in step 104. If blockage detection module 32 determines that air data is required for safe operation of aircraft 10, the blockage detection module 32 prevents initiation of the blockage detection test in step 106. Blockage detection module 32 may determine whether safe operation of aircraft 10 requires air data based on one or more indications that aircraft 10 is on the ground prior and/or stationary. For example, blockage detection module 32 may receive an indication that the aircraft is on-ground or in-flight from a weight-on-wheels (WOW) sensor of aircraft 10. Other indications that aircraft 10 is on ground or in flight include indicated airspeed, pressure altitude, and ground speed, one or more of which may be received by blockage detection module 32 in step 104. Blockage detection module 32 may allow initiation of the blockage detection test if the weight-on-wheels sensor indicates aircraft 10 is on the ground in one example. In another example, blockage detection module 32 may allow initiation of blockage detection test if the weight-on-wheel sensor indicates aircraft 10 is on the ground and ground speed of aircraft 10 is 0 knots (i.e., aircraft 10 is stationary). In either example, blockage detection module 32 may inhibit initiation of the blockage detection test in step 106 if the weight-on-wheels sensor indicates aircraft 10 in flight or if the ground airspeed of aircraft 10 is non-zero. Alternatively, step 104 may require aircraft 10 to be placed in a maintenance or test mode prior to initiation of the blockage detection test. Initiation of the maintenance or test mode may have similar protections, consuming systems 24 allowing the maintenance or test mode only if air data is not required for safe operation of aircraft 10. For implementations that do not include blockage detection module 32 integrated into aircraft 10 or air data probe 14, step 104 can be omitted.

Once the blockage detection test is initiated, blockage detection module 32 translates valve 38 from a closed position to an open position in step 108, permitting fluid from within fluid source 46 to flow through blockage detection module 32 and into cavity 44 of air data probe 14. As fluid flows into cavity 44, pressure regulator 36 acts to reduce the supply pressure delivered from fluid source 46 to a target pressure (i.e., regulated pressure) $P_{reg}$.

In step 110, pressure sensor 50 outputs signal P during time interval Δt. Signal P is indicative of a fluid pressure within cavity 44 as a function of time. The signal from pressure sensor 50 can be stored within memory 42 of blockage detection module 32 for the current time interval to form a pressure profile. From the pressure profile, one or more parameters can be determined for comparison to one or more detection criteria. For example, the average pressure within cavity 44 can be determined for time interval Δt, or a subinterval of time interval Δt. Other parameters can include determining the rate of pressure change during time interval Δt, or a subinterval of time interval Δt. Additionally, blockage detection module 32 may store signal P output from pressure sensor 50 as well as one or more associated parameters for one or more past time intervals.

In step 112, the pressure profile is compared to the regulated pressure output by pressure regulator 36 using one or more parameters determined in step 110. For example, the average pressure during time interval Δt can be compared to the expected output pressure of regulator 36 ($P_{reg}$). Alternatively, the average pressure during a subinterval of time interval Δt can be compared to the expected output pressure of regulator 36. For example, the subinterval coinciding with the last twenty-five percent to fifty percent of time interval Δt can be used to determine the average pressure at the end of the blockage detection test. Blockage detection module 32 indicates cavity 44 in a blocked state if the average pressure is equal to the regulated pressure $P_{reg}$, or if the average pressure differs from the regulated pressure $P_{reg}$ by no more than a specified margin (e.g., one to ten percent or one to five percent). Blockage detection module 32 may output an overpressure warning if the average pressure exceeds the regulated pressure by more than the specified margin (e.g., one to ten percent or one to five percent) in step 113. If the average pressure is less than the regulated pressure $P_{reg}$ or less than the regulated pressure by the specified margin, blockage detection module 32 proceeds to step 114.

In step 114, the pressure profile is compared to atmospheric pressure $P_{atm}$ using one or more parameters determined in step 110. Continuing with the average pressure example discussed in step 110, the average pressure determined during time interval Δt, or a subinterval of time interval Δt, can be compared to atmospheric pressure $P_{atm}$. If the average pressure exceeds atmospheric pressure $P_{atm}$ and is less than the regulated pressure $P_{reg}$, blockage detection module 32 indicates a partially blocked cavity 44. In some examples, blockage detection module 32 indicates a partial blocked cavity 44 if the average pressure is greater than atmospheric pressure by a specified margin (e.g., five to fifteen percent, or five to ten percent) and less than the regulated pressure by a specified margin (e.g., one to ten percent, or one to five percent), which may be different than the atmospheric pressure margin. For example, the regulated pressure margin may deviate less from the regulated pressure when compared to the atmospheric pressure margin (e.g., a regulated pressure margin from one to five percent of the regulated pressure and an atmospheric pressure range from five to ten percent of the atmospheric pressure). In other examples, the regulated pressure margin and the atmospheric pressure margin can overlap (e.g., a regulated pressure margin from one to ten percent of the regulated pressure and an atmospheric pressure margin from five to fifteen percent of the atmospheric pressure). The exemplary atmospheric pressure margin and regulated pressure margin establish upper and/or lower limits to cavity pressure during step 112 and/or step 114. If the average cavity pressure equals or is less than atmospheric pressure (or an upper atmospheric pressure margin), blockage detection module 32 indicates an unblocked cavity 44.

At the conclusion of the test, blockage detection module 32 outputs an indication of a blocked cavity, a partially blocked cavity, or an unblocked cavity in step 116. The output indication can be an electronic message displayed by one or more consuming systems 24 of aircraft 10. In other instances, the electronic message can be displayed by a user interface of a maintenance device incorporating blockage detection module 32. The blockage detection module 32 may invoke a sensory alarm, such as an audible alarm, a haptic alarm, or other sensory alarm in response to determining the status of cavity 44. The sensory alarm can be invoked by the blockage detection module 32 instead of the electronic message or in cooperation with the electronic message to provide an indication of a blocked cavity, a partially blocked cavity, and/or an unblocked cavity. Operators and/or consuming systems 24 may take further action based on the blockage indication output by blockage detection module 32. For example, air data probes containing blocked cavities may be removed from aircraft 10 and replaced during a maintenance operation. Consuming systems 24 may set air data parameter received from blocked or partially blocked air data probes into a "Fail Warned" condition and not consume the air data parameters.

In another example, steps 110, 112, and 114 can be repeated such that blockage detection module 32 performs sequential blockage detection tests. Sequential blockage detection tests may clear the blockage. In other examples, sequential blockage detection tests may verify the output of blockage detection module 32. Blockage detection module 32 may continue to perform blockage detection tests for a specified period of time or for a specified number of tests. After the testing period elapses, blockage detection module 32 translates valve 38 to the closed position. A subsequent test may be initiated as described in step 102.

FIG. 6 depicts method 100 with additional step 118 for evaluating whether the profile produced by pressure sensor 50 is increasing, decreasing, or constant. Occurring after step 112 (or step 114) and before step 116, step 118 determines if the pressure profile during time interval Δt, or a subinterval of time interval Δt, is increasing or decreasing. For example, blockage detection module 32 may calculate the slope of the pressure profile at various points during time interval Δt. Where the slope of pressure profile is positive, pressure profile is increasing whereas a negative slope indicates a decreasing pressure profile. The slope can be evaluated at a single point or averaged among multiple points during time interval Δt. In other examples, the overall pressure change during time interval can be indicative of the pressure profile slope.

If blockage detection module 32 determines cavity 44 is blocked in step 112 and the pressure profile is constant, blockage detection module 32 indicates that cavity 44 is blocked. A decreasing pressure profile combined with a blocked determination in step 112 may cause blockage detection module 32 to indicate that the blockage is clearing.

Where blockage detection module 32 determines cavity 44 is partially blocked during step 114 and the pressure profile is constant, blockage detection module 32 may indicate a partially blocked cavity 44 in step 118. For a partially blocked cavity 44 and increasing pressure profile, blockage detection module 32 may indicate a forming blockage. A decreasing pressure profile combined with a partially blocked determination for cavity 44 may cause blockage detection module 32 to indicate a clearing partial blockage in step 116.

Similarly, where cavity pressure is equal to or less than atmospheric pressure and the pressure profile is constant, blockage detection module 32 may indicate an unblocked cavity 44 in step 116. Where the pressure profile is increasing, blockage detection module 32 may indicate a forming partial blockage within cavity 44.

Steps 112, 114, 116, and 118 can be repeated such that blockage detection module 32 performs sequential blockage detection tests, which may clear a blockage and/or to verify output of a blockage detection test. Blockage detection module 32 may continue to perform blockage detection tests for a specified period of time or for a specified number of tests. After the testing period elapses, blockage detection module 32 translates valve 38 to the closed position. A subsequent test may be initiated as described in step 102.

Discussion of Possible Embodiments

The following are non-exclusive descriptions of possible embodiments of the present invention.

A System for Detecting Blockage within an Air Data Probe Cavity

A system according to an exemplary embodiment of this disclosure, among other possible things, includes a body, a sensor, a pressurized fluid source, and a blockage detection module. The body defines a cavity open to an ambient environment at a port. The sensor communicates with the cavity and produces a signal representative of a fluid pressure within the cavity. The blockage detection module includes a conduit, a pressure regulator, a valve, a processor, and a memory. The conduit defines a path between the pressurized fluid source and the cavity. The pressure regulator is disposed along the conduit. The valve is disposed along the conduit between the pressure regulator and the pressurized fluid source. The valve includes an open position that places the pressurized fluid source in communication with the cavity and a closed position that isolates the pressurized fluid source from the cavity. The memory is encoded with instructions that, when executed by the processor, cause the blockage detection module to actuate the valve to the open position to thereby release fluid from the pressurized fluid source into the cavity at a target pressure regulated by the pressure regulator. The instructions further cause the blockage detection module to receive a signal indicate of a pressure of the fluid within the cavity as a function of time and during a time interval. The instructions cause the blockage detection module to compare the signal to at least one criterion and output a blockage indication based on the comparison of the signal to the at least one criterion.

The system of the preceding paragraph can optionally include, additionally and/or alternatively, any one or more of the following features, configurations and/or additional components.

A further embodiment of the foregoing system, wherein comparing the signal to at least one criterion can include determining an average pressure during the time interval from the signal and comparing the average pressure to the target pressure of the pressure regulator.

A further embodiment of any of the foregoing systems, wherein the blockage indication can represent a blockage of the cavity if the average pressure is equal to the target pressure.

A further embodiment of any of the foregoing systems, wherein comparing the signal to at least one criterion can include comparing the average pressure to an ambient pressure.

A further embodiment of any of the foregoing systems, wherein the blockage indication can represent a partial blockage of the cavity if the average pressure is greater than the ambient pressure and less than the target pressure.

A further embodiment of any of the foregoing systems, wherein the blockage indication can represent an unblocked cavity if the average pressure is less than the ambient pressure.

A further embodiment of any of the foregoing systems, wherein comparing the signal to at least one criterion can include determining an average pressure during the time interval and an average rate of pressure change during the time interval.

A further embodiment of any of the foregoing systems, wherein the blockage indication can represent a clearing blockage when the average pressure is equal to the target pressure and the average rate of pressure change is decreasing.

A further embodiment of any of the foregoing systems, wherein comparing the signal to at least one criterion can include determining an average pressure during the time interval and an average rate of pressure change during the time interval.

A further embodiment of any of the foregoing systems, wherein the blockage indication can represent a clearing partial blockage when the average pressure is less than the target pressure, the average pressure is greater than an ambient pressure, and the average rate of pressure change is decreasing.

A further embodiment of any of the foregoing systems can include a fitting mounted to the body and communicating with the cavity.

A further embodiment of any of the foregoing systems, wherein the blockage detection module can be discrete from the body and can connect to the cavity via the fitting.

An Air Data System for Detecting Blockage within an Air Data Probe Cavity

An air data system in accordance with an exemplary embodiment of this disclosure includes, among other possible things, a pressurized fluid source and an air data probe. The air data probe includes a body, a housing, a sensor, and a blockage detection module. The body defines a cavity open to an ambient environment at a port. The housing mounts to the body. The sensor mounts within the housing and communicates with the cavity. The sensor produces a signal representative of a fluid pressure within the cavity. The blockage detection module includes a conduit, a pressure regulator, a valve, a processor, and a memory. The conduit defines a path between the pressurized fluid source and the cavity. The pressure regulator is disposed along the conduit. The valve is disposed along the conduit between the pressure regulator and the pressurized fluid source. The valve includes an open position that places the pressurized fluid source in communication with the cavity and a closed position that isolates the pressurized fluid source from the cavity. The memory is encoded with instructions that, when executed by the processor, cause the blockage detection module to actuate the valve to the open position to thereby release fluid from the pressurized fluid source into the cavity at a target pressure regulated by the pressure regulated. The instructions further cause the blockage detection module to receive a signal indicative of a pressure of the fluid within the cavity as a function of time within a time interval. The instructions cause the blockage detection module to compare the signal to at least one criterion and output a blockage detection indication based on the comparison of the signal to the at least one criterion.

The air data system of the preceding paragraph can optionally include, additionally and/or alternatively, any one or more of the following features, configurations and/or additional components.

A further embodiment of the foregoing air data system, wherein the pressurized fluid source can be bleed air extracted from a compressor of a gas turbine engine.

A further embodiment of any of the foregoing air data systems, wherein the pressurized fluid source can be a pressurized bottle mounted within an aircraft.

A further embodiment of any of the foregoing air data systems, wherein the pressurized fluid source can be a mobile pressurized bottle that is not mounted to an aircraft.

A further embodiment of any of the foregoing air data systems, wherein the blockage detection module can be mounted within the housing.

A further embodiment of any of the foregoing air data systems, wherein the blockage detection module can be mounted to an exterior surface of the housing.

A further embodiment of any of the foregoing air data systems, wherein the body can include a base.

A further embodiment of any of the foregoing air data systems, wherein the body can include an exterior surface contoured to match an exterior contour of an aircraft.

A further embodiment of any of the foregoing air data systems, wherein the port can be located at the exterior surface of the base.

A further embodiment of any of the foregoing air data systems, wherein the body can include a strut that extends from the base.

A further embodiment of any of the foregoing air data systems, wherein the body can include a barrel portion extending from the strut.

A further embodiment of any of the foregoing air data systems, wherein the port can be formed by the barrel portion.

A further embodiment of any of the foregoing air data systems, wherein the blockage detection module can be remote from the air data probe.

A further embodiment of any of the foregoing air data systems, wherein comparing the signal to at least one criterion can include determining an average pressure during the time interval from the signal and comparing the average pressure to the target pressure of the pressure regulator.

A further embodiment of any of the foregoing air data systems, wherein the blockage indication can represent a blockage of the cavity if the average pressure is equal to the target pressure.

A further embodiment of any of the foregoing air data systems, wherein comparing the signal to at least one criterion can include comparing the average pressure to an ambient pressure.

A further embodiment of any of the foregoing air data systems, wherein the blockage indication can represent a partial blockage of the cavity if the average pressure is greater than the ambient pressure and less than the target pressure.

A further embodiment of any of the foregoing air data systems, wherein the blockage indication can represent an unblocked cavity if the average pressure is less than the ambient pressure.

A further embodiment of any of the foregoing air data systems, wherein comparing the signal to at least one criterion can include determining an average pressure during the time interval and an average rate of pressure change during the time interval.

A further embodiment of any of the foregoing air data systems, wherein the blockage indication can represent a clearing blockage when the average pressure is equal to the target pressure and the average rate of pressure change is decreasing.

A further embodiment of any of the foregoing air data systems, wherein comparing the signal to at least one criterion can include determining an average pressure during the time interval and an average rate of pressure change during the time interval.

A further embodiment of any of the foregoing air data systems, wherein the blockage indication can represent a clearing partial blockage when the average pressure is less than the target pressure, the average pressure is greater than an ambient pressure, and the average rate of pressure change is decreasing.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising:
   a body defining a cavity open to an ambient environment at a port;
   a sensor in communication with the cavity, wherein the sensor produces a signal representative of a fluid pressure within the cavity;
   a pressurized fluid source; and
   a blockage detection module comprising:
      a conduit defining a path between the pressurized fluid source and the cavity;
      a pressure regulator disposed along the conduit;
      a valve disposed along the conduit between the pressure regulator and the pressurized fluid source, the valve comprising an open position that places the pressurized fluid source in communication with the cavity and a closed position that isolates the pressurized fluid source from the cavity;
      a processor; and
      a memory encoded with instructions that, when executed by the processor, cause the blockage detection module to:
         actuate the valve to the open position to thereby release fluid from the pressurized fluid source into the cavity at a target pressure regulated by the pressure regulator;
         receive the signal indicative of the fluid pressure within the cavity as a function of time during a time interval;
         comparing the signal to at least one criterion by determining an average pressure during at least a subinterval of the time interval from the signal and comparing the average pressure to the target pressure of the pressure regulator; and
         outputting a blockage indication based on the comparison of the signal to the at least one criterion, wherein the blockage indication represents a blockage of the cavity if the average pressure differs from target pressure by no more than a specified margin with respect to the target pressure.

2. The system of claim 1, wherein comparing the signal to at least one criterion includes determining the average pressure during the time interval from the signal and comparing the average pressure to the target pressure of the pressure regulator, and wherein the blockage indication represents a blockage of the cavity if the average pressure is equal to the target pressure.

3. The system of claim 2, wherein comparing the signal to at least one criterion includes comparing the average pressure to an ambient pressure, and wherein the blockage indication represents a partial blockage of the cavity if the average pressure is greater than the ambient pressure and less than the target pressure.

4. The system of claim 3, wherein the blockage indication represents an unblocked cavity if the average pressure is equal to or less than the ambient pressure.

5. The system of claim 1, wherein comparing the signal to at least one criterion includes determining an average pressure during the time interval and an average rate of pressure change during the time interval, and wherein the blockage indication represents a clearing blockage when the average pressure is equal to the target pressure and the average rate of pressure change is decreasing.

6. The system of claim 1, wherein comparing the signal to at least one criterion includes determining an average pressure during the time interval and an average rate of pressure change during the time interval, and wherein the blockage indication represents a clearing partial blockage when the average pressure is less than the target pressure, the average pressure is greater than an ambient pressure, and the average rate of pressure change is decreasing.

7. The system of claim 1, further comprising a fitting mounted to the body and communicating with the cavity, wherein the blockage detection module is discrete from the body and is connectable to the cavity via the fitting.

8. An air data system comprising:
   a pressurized fluid source; and
   an air data probe comprising:
      a body defining a cavity open to an ambient environment at a port;
      a housing mounted to the body;
      a sensor mounted within the housing and communicating with the cavity, wherein the sensor produces a signal representative of a fluid pressure within the cavity;
      a blockage detection module comprising:
         a conduit defining a path between the pressurized fluid source and the cavity;
         a pressure regulator disposed along the conduit;
         a valve disposed along the conduit between the pressure regulator and the pressurized fluid source, the valve comprising an open position that places the pressurized fluid source in communication with the cavity and a closed position that isolates the pressurized fluid source from the cavity;
         a processor; and
         a memory encoded with instructions that, when executed by the processor, cause the blockage detection module to:
            actuate the valve to the open position to thereby release fluid from the pressurized fluid source into the cavity at a target pressure regulated by the pressure regulator;
            receive the signal indicative of the fluid pressure within the cavity as a function of time during a time interval;
            comparing the signal to at least one criterion by determining an average pressure during at least a subinterval of the time interval from the signal and comparing the average pressure to the target pressure of the pressure regulator; and
            outputting a blockage indication based on the comparison of the signal to the at least one criterion, wherein the blockage indication represents a blockage of the cavity if the average pressure differs from target pressure by no more than a specified margin with respect to the target pressure.

9. The air data system of claim 8, wherein the pressurized fluid source is bleed air extracted from a compressor of a gas turbine engine or a pressurized bottle mounted within an aircraft.

10. The air data system of claim 8, wherein the pressurized fluid source is a mobile pressurized bottle that is not mounted to an aircraft.

11. The air data system of claim 8, wherein the blockage detection module is mounted within the housing.

12. The air data system of claim 8, wherein the blockage detection module is mounted to an exterior surface of the housing.

13. The air data system of claim 8, wherein the body includes:
   a base that includes an exterior surface contoured to match an exterior contour of an aircraft, wherein the port is located at the exterior surface of the base.

14. The air data system of claim 8, wherein the body includes:
   a base that includes an exterior surface contoured to match an exterior contour of an aircraft;
   a strut that extends from the base; and
   a barrel portion extending from the strut, wherein the port is formed by the barrel portion.

15. The air data system of claim 8, wherein the blockage detection module is separate from the body of the air data probe.

16. The air data system of claim 8, wherein comparing the signal to at least one criterion includes determining an average pressure during the time interval from the signal and comparing the average pressure to the target pressure of the pressure regulator, and wherein the blockage indication represents a blockage of the cavity if the average pressure is equal to the target pressure.

17. The system of claim 16, wherein comparing the signal to at least one criterion includes comparing the average pressure to an ambient pressure, and wherein the blockage indication represents a partial blockage of the cavity if the average pressure is greater than the ambient pressure and less than the target pressure.

18. The system of claim 17, wherein the blockage indication represents an unblocked cavity if the average pressure is equal to or less than the ambient pressure.

19. The system of claim 8, wherein comparing the signal to at least one criterion includes determining an average pressure during the time interval and an average rate of pressure change during the time interval, and wherein the blockage indication represents a clearing blockage when the average pressure is equal to the target pressure and the average rate of pressure change is decreasing.

20. The system of claim 8, wherein comparing the signal to at least one criterion includes determining an average pressure during the time interval and an average rate of pressure change during the time interval, and wherein the blockage indication represents a clearing partial blockage when the average pressure is less than the target pressure, the average pressure is greater than an ambient pressure, and the average rate of pressure change is decreasing.

* * * * *